(12) United States Patent
Komatsu et al.

(10) Patent No.: US 7,493,318 B2
(45) Date of Patent: Feb. 17, 2009

(54) SYSTEM FOR PREFETCHING DATA NECESSARY TO EXECUTE PROGRAM FROM DATABASE

(75) Inventors: Hideaki Komatsu, Yokohama (JP); Akira Koseki, Sagamihara (JP); Toshio Suganuma, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/608,091

(22) Filed: Dec. 7, 2006

(65) Prior Publication Data

US 2007/0156646 A1 Jul. 5, 2007

(30) Foreign Application Priority Data

Dec. 27, 2005 (JP) ............................ 2005-374821

(51) Int. Cl.
*G06F 17/30* (2006.01)
(52) U.S. Cl. ............................................. 707/3; 707/2
(58) Field of Classification Search ...................... 707/2, 707/3, 4
See application file for complete search history.

(56) References Cited

FOREIGN PATENT DOCUMENTS

JP 2004-295458 10/2004

OTHER PUBLICATIONS

Masaharu Murozumi, et al., Exposition of next generation standard "SQL99"—from relational to object relational, Interop Magazine, Japan, Softbank Publishing Corp., Dec. 1, 1999, vol. 9, No. 10, pp. 91-101.
Nagasuka et al., "High Speed Function of Batch Processing by Virtualizing Input-Output and Parallel Execution: PREST", vol. 35, No. 5, May 1994, pp. 856-864.

*Primary Examiner*—Mohammad Ali
*Assistant Examiner*—Jason L Alvesteffer
(74) *Attorney, Agent, or Firm*—Wayne P. Bailey; Shimokaji & Associates, P.C.

(57) ABSTRACT

In order to improve the efficiency of execution of a program by prefetching data necessary to execute the program, a system is provided that causes a computer to execute a recursive query prior to a program being subjected to prefetching. This system detects from iterative processing in the program a query to generate a resultant table by selecting a record that satisfies a selection condition from a target table. The system generates an initial query to generate an initial table that includes values of variables that are set prior to starting the iterative processing in the program. Furthermore, the system generates a recursive query to generate the next intermediate table that is referred to in the next and later cycles of the iterative processing, in the recursive query corresponding to each cycle of the iterative processing that is sequentially performed, from an intermediate table that includes resultant tables generated by a target query in the preceding cycles of the iterative processing and the target table. Furthermore, the system generates a final query to generate a final table from the intermediate table sequentially generated by the recursive query.

1 Claim, 16 Drawing Sheets

```
1:  personID = 1;
2:  while() {
3:    if (personID == 0) break;
4:    personTaskListBean = personTaskListHome.findByPrimaryKey(personID);
5:    taskID = getDataFromFile();
6:    taskBean = taskHome.findByPrimaryKey(taskID);
7:    taskName = taskBean.getTaskName();
8:    personTaskListBean.setTaskName(taskName);
9:    personID = personTaskListBean.getNextID();
10: }
```

PersonTaskList  35

| ID | Name | TaskName | NextID |
|---|---|---|---|
| 1 | Suzuki | A | 3 |
| 2 | Yamada | X | 8 |
| 3 | Kawai | V | 10 |
| ... | ... | ... | ... |

(b)

Task  35

| TID | TaskName |
|---|---|
| 1 | C |
| 2 | X |
| ... | ... |

FIG. 8

(a)
```
                                                                               80
1: with recursive temp ( ROWS_LAST ) as
2: (select 0' _ (L+1), E_IN from dummy d where d.id = 1
3: union all
4: select [OF](FX()), ROWS_LAST_CUTTAIL, E_IN from [T](FX()), temp t , dummy d where
5: [F](FX())(FY(ROWS_LAST, E_IN)) and d.id = case when FT(ROWS_LAST, E_IN) then 0 else 1
6: end
7: )
8: select ROWS_HEAD from temp
```

(b)
```
                                                                               82
1: with recursive temp (f_1_1, f_1_2, f_1_3, f_1_4) as
2: (select "dummy" , "dummy" , "dummy" , 1 from dummy d where d.id = 1
3: union all
4: select p.ID, p.Name, p.TaskName, p.nextID from PersonTaskList p, temp t, dummy d where
5: p.ID = t.f_1_4 and d.id = case when t.f_1_4 = 0 then 0 else 1 end
6: )
7: select f_1_1, f_1_2, f_1_3, f_1_4 from temp
```

(c)
```
                                                                               84
1: with recursive temp (f_1_1, f_1_2, f_1_3, f_1_4, count) as
2: (select "dummy" , "dummy" , "dummy" , 1, 0 from dummy d where d.id = 1
3: union all
4: select p.ID, p.Name, p.TaskName, p.nextID t.count+1 from PersonTaskList p, temp t, dummy
5: d where p.ID = t.f_1_4 and d.id = case when t.f_1_4 = 0 then 0 else 1 end and t.count
6: < MAX
7: )
8: select f_1_1, f_1_2, f_1_3, f_1_4 from temp
```

```
1:  int greater = X;
2:  int less = Y;
3:  float aValue = Z;

4:  while() {

5:      int middle = (greater+less)/2;

6:      if (aValue - MyFunc(middle) == 0.0) break;

7:      bean = home.findByPrimarykey(middle)
8:      aValue = bean.getAValue();

9:      if (aValue - MyFunc(middle) > 0.0) {
10:         greater = middle;
11:     } else {
12:         less = middle;
13:     }

ARawData

| ID | ... | aValue | ... |
|---|---|---|---|
| 1 | ... | 0.112 | ... |
| 2 | ... | 0.114 | ... |
| 3 | ... | 0.24 | ... |
| ... | ... | ... | ... |

FIG. 11

IDENT

| greater | less | X1 | X2 |
|---------|------|----|----|
| X | Y | X | Y |

```
 1: with recursive temp (f_1_1, f_1_2, f_1_3, f_1_4) as
 2: (select (X+Y)/2, Z, X, Y from dummy d where d.id = 1
 3: union all
 4: select a.ID, a.aValue, i.greater, i.less from ARawData a, IDENT i, temp t, dummy d where
 5: i.X1 = case when t.f_1_2-MyFunc(t.f_1_1) > 0.0 then (t.f_1_3+t.f_1_4)/2 else t.f_1_3 end
 6: and i.X2 = case when !(t.f_1_2-MyFunc(t.f_1_1) > 0.0) then (t.f_1_3+t.f_1_4)/2 else
 7: t.f_1_4 end and a.ID = (t.f_1_3+t.f_1_4)/2 and d.id = case when t.f_1_2-MyFunc(t.f_1_1)
 8: = 0.0 then 0 else 1 end
 9: )
10: select f_1_1, f_1_2, f_1_3, f_1_4 from temp
```

82

(b)

```
1: with recursive temp (f_1_1, f_1_2, f_1_3, f_1_4) as
2: (select (X+Y)/2, Z, X, Y from dummy d where d.id = 1
3: union all
4: select a.ID, a.aValue, case when t.f_1_2-MyFunc(t.f_1_1) > 0.0 then (t.f_1_3+t.f_1_4)/2
5: else t.f_1_3 end, case when !(t.f_1_2-MyFunc(t.f_1_1) > 0.0) then (t.f_1_3+t.f_1_4)/2
6: else t.f_1_4 end from ARawData a, temp t, dummy d where a.ID = (t.f_1_3+t.f_1_4)/2 and
7: d.id = case when t.f_1_2-MyFunc(t.f_1_1) = 0.0 then 0 else 1 end
8: )
9: select f_1_1, f_1_2, f_1_3, f_1_4 from temp
```

```
1:  List<String> deptCodes = new LinkedList();
2:  deptCodes.add("S7000");
3:  while (!deptCodes.isEmpty()) {
4:    String deptno = deptCodes.remove(0);
5:    DepartmentBean department = departmentHome.findByPrimaryKey(deptno);
6:    int mgrNo = department.getManagerNo();
7:    EmployeeBean employees[] = employeeHome.findByManagerNo(mgrNo);
8:    for (int i = 0; i < employees.length; i++) {
9:      employees[i].increaseSalary(10000);
10:     DepartmentBean subDept =
11:       departmentHome.findByManagerNo(employees[i].getEmployeeNo());
12:     if (subDept != null) {
13:       deptCodes.add(subDept.getDepartmentCode());
14:     }
15:   }
16: }
```

EMPLOYEE TABLE  35

| EMPLOYEE NUMBER (getEmployeeNo()) | NAME | SALARY (increaseSalary(int)) | MANAGER (findByManagerNo(int)) |
|---|---|---|---|
| 10000 | Kuse | 1000000 | 5000 |
| 20000 | Nakatani | 900000 | 10000 |
| 30000 | Kosaka | 800000 | 10000 |
| 40001 | Koseki | 700000 | 20000 |
| 40002 | Kondo | 600000 | 20000 |
| ... | ... | ... | ... |

(b)

ORGANIZATION TABLE  35

| DEPARTMENT CODE | MANAGER (getManagerNo()) | NAME |
|---|---|---|
| S7000 | 10000 | TRL |
| S7400 | 20000 | Systems |
| S7700 | 30000 | PMT |

```
1: with recursive temp (f_1_1, f_1_2) as
2: (Select S7400, "dummy" from dummy d where d.id = 1
3: union all
4:   Select d1.deptCode, e.saraly from Dept d1, Employee e, Dept d2, temp t, dummy d where
5:   d1.mgrNum = e.empNum and e.mgrNum = d2.mgrNum and d2.deptCode = t.f_1_1 and d.id = case
6:   when Select d1.deptCode, e.saraly from Dept d1, Employee e, Dept d2, temp t, dummy d where
7:   d1.mgrNum = e.empNum and e.mgrNum = d2.mgrNum and d2.deptCode = t.f_1_1 = null then 0
8:   else 1 end
9: )
10: select f_1_1, f_1_2 from temp
```

```
1: with recursive temp (f_1_1, f_1_2) as
2: (Select S7400, "dummy" from dummy d where d.id = 1
3: union all
4: Select d1.deptCode, e.saraly from Dept d1, Employee e, Dept d2, temp t, dummy d where
5: d1.mgrNum = e.empNum and e.mgrNum = d2.mgrNum and d2.deptCode = t.f_1_1
6: )
7: select f_1_1, f_1_2 from temp
```

SYSTEM FOR PREFETCHING DATA NECESSARY TO EXECUTE PROGRAM FROM DATABASE

BACKGROUND OF THE INVENTION

1. Field of the Invention

The present invention relates to a system for efficiently accessing a database by executing an input program that accesses the database after analysis. In particular, the present invention relates to a system for improving the efficiency of access to a database when such a program including iterative processing is executed.

2. Description of the Related Art

With the recent spread of Java2 Enterprise Edition (J2EE), Java Database Connectivity (JDBC), and the like, access to databases by executing programs written in, for example, the Java (trademark of Sun Microsystems, Inc) language have been enabled. For example, a program that accesses a database is executed in an application server apparatus. The program reads necessary data from the database, determines the condition, and updates the database on the basis of the result of the determination. When an enormous amount of data is processed, a method is used in which iterative processing is described in a program and multiple pieces of data included in a database are sequentially processed.

Such iterative processing is called batch processing. When a database is accessed every time iterative processing is performed in batch processing, the number of accesses to the database may become very large, and thus the efficiency of processing may be decreased. On the other hand, in some types of batch processing, data to be accessed can be statically analyzed prior to processing the data. In these cases, it is preferable that an application server apparatus read in advance data necessary for iterative processing from a database all at once prior to starting iterative processing. A technique for semi-automatically improving the efficiency of batch processing is proposed as a related art (see Non-Patent Document 1).

[Non-Patent Document 1] Jouhou Shori Gakkai Ronbun Shi Vol. 35, No. 5, May 1994.

3. Problems to be Solved by the Invention

However, in some types of batch processing, data to be accessed is determined in the process of iterative processing. For example, when a row has been read from a table for the first time when the iterative processing is performed, another row to be read may be determined by an identification number included in the first row. In this case, data to be accessed in the second query cannot be known prior to performing the first query. Thus, data necessary for iterative processing cannot be read in advance prior to starting iterative processing. Accordingly, a database is accessed every time iterative processing is performed, so that the efficiency of execution of a program may be decreased.

An object of the foregoing related art is to improve the efficiency of the process of sending and receiving data between a plurality of jobs or job steps as to the jobs or the job steps included in batch processing. On the other hand, a plurality of inefficient accesses may occur in a single job. This art is not applicable to this case.

Accordingly, it is an object of the present invention to provide a system, a method, and a control program that provides solutions to the foregoing problems. This object can be achieved by combinations of features described in independent claims in the claims. Dependent claims define further advantageous concrete examples of the present invention.

BRIEF SUMMARY OF THE INVENTION

To resolve the foregoing problems, in a first embodiment of the present invention, a system is provided. In the system, a computer generates a recursive query and executes the recursive query prior to executing a program subjected to prefetching to prefetch data necessary to execute the program from a database and supply the data to the program, the recursive query including an initial query that generates an initial table, a recursive query that generates a next intermediate table that satisfies a selection condition from an intermediate table that is the initial table or a table that is generated by the last recursive query, and a final query that generates and outputs a final table from the individual intermediate tables. The system includes an acquiring unit that acquires the program subjected to prefetching, an instruction detecting unit that detects a query as a target query subjected to prefetching from iterative processing in the program, the query selecting a record that satisfies a predetermined selection condition from a target table to generate a resultant table, an initial-query generating unit that generates as an initial query a query to generate as an initial table a table that includes values of variables that are set in advance prior to starting the iterative processing in the program, a recursive-query generating unit that generates as a recursive query a query to generate the next intermediate table, in the recursive query corresponding to each of cycles of the iterative processing that are sequentially performed, by selecting columns that are referred to by a target query in next and later cycles of the iterative processing and a record that satisfies the predetermined selection condition from the target table and an intermediate table that includes resultant tables generated by a target query in the preceding cycles of the iterative processing, and a final-query generating unit that generates as a final query a query to select at least some of columns of the intermediate table sequentially generated by the recursive query. Moreover, a method for generating a recursive query by means of the system and a program for causing the computer to function as the system are provided.

The foregoing outline of the present invention does not include all necessary features of the present invention, and sub-combinations of these features may be implemented as the present invention.

According to the present invention, for more programs than ever, the efficiency of execution of the programs can be improved by prefetching data necessary to execute the programs from a database.

BRIEF DESCRIPTION OF THE SEVERAL VIEWS OF THE DRAWINGS

FIG. 2 shows a first example of a target program 20 input to an application server 40.

FIG. 3 shows exemplary data in a database 35, the data being necessary to execute the first example of the target program 20.

FIG. 8 shows template instructions 80, a recursive query 82, which is generated on the basis of the target program 20 according the first example, and an improved query 84 in parallel.

FIG. 9 shows a second example of the target program 20 input to the application server 40.

FIG. 10 shows an example of data, out of the database 35, necessary to execute the second example of the target program 20.

FIG. 11 shows an additional table necessary to analyze the program in the second example.

FIG. 12 shows concrete examples of the recursive query 82 that are generated on the basis of the target program 20 in the second example.

FIG. 13 shows a third example of the target program 20 input to the application server 40.

FIG. 14 is an example of data, out of the database 35, necessary to execute the target program 20 in the third example.

FIG. 15 shows a concrete example of the recursive query 82 generated on the basis of the target program 20 in the first example.

FIG. 16 shows the improved query 84 that is an improved example of the recursive query 82.

REFERENCE NUMERALS

Figure 1:
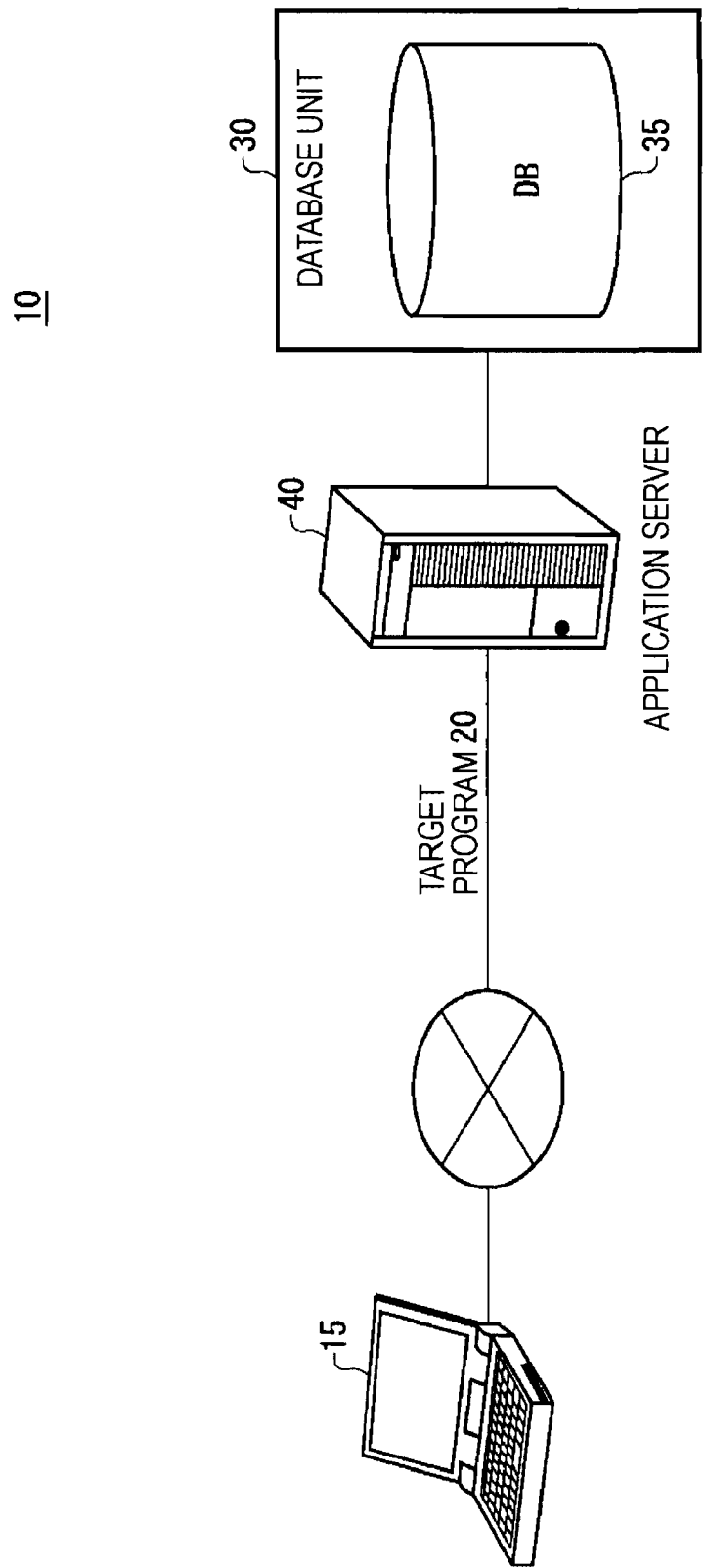
FIG. 1 shows the overall structure of an information processing system 10 according to embodiments of the present invention.

10: information processing system
15: terminal unit
20: target program
30: database unit
35: database
40: application server
42: program analysis unit
45: program execution unit
48: cache unit
80: template instructions
82: recursive query
84: improved query
400: acquiring unit
410: instruction detecting unit
420: first-calculation-formula detecting unit
430: second-calculation-formula detecting unit
440: number-of-columns setting unit
450: initial-query generating unit
460: recursive-query generating unit
470: final-query generating unit
900: computer

DETAILED DESCRIPTION OF THE INVENTION

The present invention will now be described with embodiments of the present invention. The following embodiments do not put limitations on the present invention defined in the claims. All combinations of features described in the embodiments are not always necessary for means for solving the problems of the present invention.

FIG. 1 shows the overall structure of an information processing system 10 according to the embodiments of the present invention. The information processing system 10 includes a terminal unit 15, a database unit 30, and an application server 40. The terminal unit 15 sends the application server 40 a program for issuing instructions to access a database 35. This program is referred to as a target program 20.

The target program 20 is written in, for example, application programming interfaces (APIs) based on Enterprise Java Beans (EJB) of the Java language (registered trademark).

The application server 40 executes the target program 20 to instruct the database unit 30 to acquire data from the database 35 and to instruct the database unit 30 to write data to the database 35. That is to say, for example, the application server 40 functions as a virtual machine of the Java language, interprets APIs of EJB, executes the target program 20, and sends the database unit 30 an instruction sequence of, for example, structured query language (SQL) as necessary. The database unit 30 includes the database 35. The database unit 30 reads data from the database 35 according to the instruction sequence of SQL received from the application server 40 and sends the application server 40 the data. Moreover, the database unit 30 updates data in the database 35 according to the instruction sequence.

In the foregoing information processing system 10, when the application server 40 frequently sends instructions of SQL to the database unit 30, communication frequently occurs between the database unit 30 and the application server 40. Thus, the efficiency of execution of the target program 20 is decreased. In contrast, it is known that the efficiency of execution of the target program 20 can be improved by prefetching necessary data all at once from the database 35 prior to executing the target program 20 and decreasing the frequency of communication. The application server 40 according to the embodiments of the present invention uses recursive queries, which were introduced in SQL99, to prefetch instructions that have not been subjected to prefetching in known techniques. Thus, the efficiency of execution of the target program 20 can be further improved.

FIG. 2 shows a first example of the target program 20 input to the application server 40. FIG. 3 shows exemplary data in the database 35, the data being necessary to execute the first example of the target program 20. The target program 20 assigns tasks managed in a table called Task to persons managed in a table called PersonTaskList to record the assigned results in PersonTaskList.

The sequence in which a person to whom a task is assigned is selected is determined by NextID recorded in PersonTaskList. That is to say, since NextID corresponding to Suzuki is 3, a person to whom a task is assigned next to Suzuki is Kawai. The sequence in which a task to be assigned is selected is recorded in an external file. Then, TaskName corresponding to a number that is sequentially read from the file is read from the table Task and assigned to a person.

In particular, the target program 20 includes in the first line an instruction to assign a constant one to a variable personID. Since this variable is used as a key for reading a record from a table in a database in the fourth line, the variable is called key variable. The target program 20 includes in the second line a while instruction to indicate the start of iterative processing. The iterative processing corresponds to a part from this instruction to a brace in the tenth line corresponding to a brace in this instruction.

The target program 20 includes in the third line an instruction to stop the iterative processing when the key variable is equal to zero. That is to say, the termination condition of the iterative processing is that the key variable is equal to zero. The target program 20 includes in the fourth line an instruction to select a record from a table called personTaskListHome, with the key variable being a primary key. The record selected by this instruction is transformed into an object called bean that can be referred to by a program written in the Java language. This beans is assigned to a variable called personTaskListBean.

The target program 20 includes in the fifth line an instruction to read a value from a predetermined file and assign the value to a variable taskID. The target program 20 includes in the sixth line an instruction to select a record from a table called taskHome, with the variable taskID being a primary key. The record selected by this instruction is transformed into a bean and assigned to a variable taskBean. The target program 20 includes in the seventh line an instruction to acquire data in a column called taskName from the bean of taskBean. The acquired data is assigned to a variable taskName.

The target program 20 includes in the eighth line an instruction to record the value of the variable taskName in personTaskListBean. The target program 20 includes in the ninth line an instruction to acquire a value from a column called NextID in personTaskListBean and assign the value to the variable personID.

It is assumed that the target program 20 generally satisfies the following first to seventh conditions:

1. A whole set of the results of queries can be chronologically divided into a plurality of subsets, and the chronologically nth result can be parameterized with n and referred to. Parts of a program that generate the nth result can be determined corresponding to this division.

2. Names are assigned to the result of the chronologically nth query and pieces of external data (read from files and the like) that are required by the query, and the result and the pieces of external data can be referred to from anywhere at anytime.

3. The chronologically nth query depends only on the results of the first to (n−1)th queries and pieces of external data that are required by these queries.

4. The relationships between input necessary for the chronologically nth query and the data described in the foregoing item 3 necessary for the query can be expressed by functions provided in an SQL execution system or user-defined functions that can be constructed under an SQL execution system.

5. The number of the relationships described in the foregoing item 4 is limited regardless of the number n of the subsets, and the relationships can be determined, with n being a parameter. Alternatively, the number of the parts of the program described in the foregoing item 1 is limited regardless of the number n of the subsets, and the parts of the program can be determined, with n being a parameter, under the same conditions.

6. It can be determined whether the chronologically last element in the set is last when the chronological number is n on the basis of the results of the first to (n−1)th queries, pieces of external data that are required by these queries, and the result of the nth query.

7. Acquiring external data does not depend on the result of a query, and all external data can be prefetched prior to the execution.

Any program that satisfies the foregoing conditions is subjected to prefetching by the information processing system 10 regardless of the control structure or the content of queries and is a program subjected to prefetching.

The database 35 includes the table PersonTaskList, as shown in part (a) of FIG. 3. This table is a table for managing persons and includes columns ID, Name, TaskName, and NextID. For example, the first record in this table indicates that the name of a person whose ID is 1 is Suzuki, the name of a task assigned to Suzuki is A, and the ID of a person to whom a task is assigned next to Suzuki is 3.

The database 35 further includes the table Task, as shown in part (b) of FIG. 3. This table is a table for managing tasks and includes columns TID and TaskName. For example, the first record in this table indicates that the name of a task having TID of 1 is C.

Referring to FIG. 2 in parallel with part (b) of FIG. 3 shows that a plurality of records are sequentially read from the table Task by the instruction in the sixth line in the target program 20 every time the iterative processing is performed. Similarly, a plurality of records are sequentially read from the table PersonTaskList by the instruction in the fourth line in the target program 20 every time the iterative processing is performed. When the application server 40 executes these instructions without alteration, communication with the database 35 occurs on every execution, and thus the efficiency is low. Accordingly, it is preferable that, before the start of the iterative processing described in the second line, data necessary for the iterative processing following the second line be acquired in advance.

The table Task shown in part (b) of FIG. 3 is accessed, with the variable taskID, to which a value is assigned in the fifth line in the target program 20, being a key. The value of the variable taskID is determined by data that is sequentially read from an external file. Thus, when the content of the file is statically determined, the application server 40 can be supposed to perform an analysis in advance to determine which record in the table Task is necessary.

On the other hand, data is read from the table PersonTaskList shown in part (a) of FIG. 3 by the instruction in the fourth line in the target program 20, with the key variable personID being a key. An initial value is assigned to this key variable in the first line, and then the key variable is sequentially updated on the basis of the result of a target query in the preceding iterative processing every time the instruction in the ninth line is performed. That is to say, every iterative processing depends on the preceding iterative processing. Thus, as to the table PersonTaskList, it is difficult to perform an analysis to determine in advance prior to the iterative processing which record is to be read. When the content of PersonTaskList is analyzed, prefetching of data is supposed to be possible. However, in this case, communication with the database 35 occurs, and thus the efficiency of processing cannot be improved.

The application server 40 according to the present embodiments enables prefetching even for a table, such as PersonTaskList, for which prefetching is difficult, using recursive queries. The functions will now be described with reference to FIG. 4.

Figure 4:
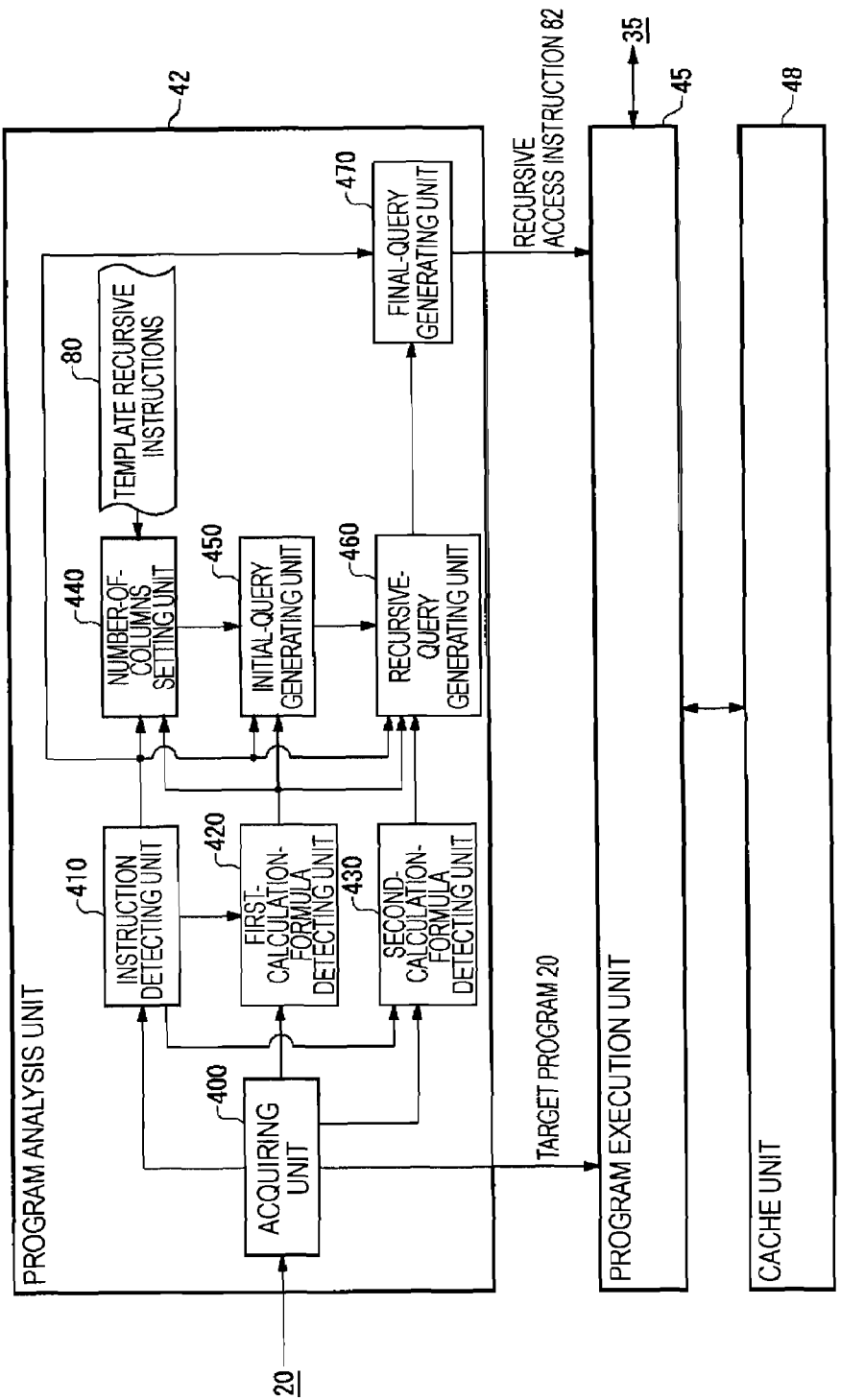
FIG. 4 shows the functional structure of the application server 40 according to the embodiments of the present invention.

FIG. 4 shows the functional structure of the application server 40 according to the embodiments of the present invention. The application server 40 causes a computer such as a computer 900 described below to function as a program analysis unit 42, a program execution unit 45, and a cache unit 48. The functions of the program analysis unit 42 and the program execution unit 45 are typically implemented via software such as a control program according to the present invention. Moreover, the cache unit 48 is, for example, a RAM 1020 or a hard disk drive 1040, which are described below, and the control program causes the RAM 1020, the hard disk drive 1040, or the like to function as the cache unit 48.

The program analysis unit 42 obtains the target program 20 from the terminal unit 15, sends the target program 20 to the program execution unit 45, and analyzes the details of access to the database 35 by scanning the target program 20. Then, on the basis of the analysis result, the program analysis unit 42 generates a recursive query 82 that prefetches data necessary for a target query in iterative processing and sends the recursive query 82 to the program execution unit 45. The program execution unit 45 executes the recursive query 82 prior to executing the target program 20 to acquire data necessary to execute the target program 20 from the database 35 and record the data in the cache unit 48. Then, the program execution unit 45 executes the target program 20 and reads data necessary in the execution process from the cache unit 48 instead of acquiring the data from the database 35.

The cache unit 48 is a storage area called bean cache of the EJB container and stores records of tables that constitute the DB 35 in the form of an object called bean. Records that are obtained from the database 35 by executing the recursive query 82 are transformed into beans by the program execution unit 45, recorded in the cache unit 48, and can be referred to by the target program 20 to be executed later.

The program analysis unit 42 includes an acquiring unit 400, an instruction detecting unit 410, a first-calculation-formula detecting unit 420, a second-calculation-formula detecting unit 430, a number-of-columns setting unit 440, an initial-query generating unit 450, a recursive-query generating unit 460, and a final-query generating unit 470. The acquiring unit 400 acquires the target program 20 from the terminal unit 15 and sends the target program 20 to the program execution unit 45. The instruction detecting unit 410 detects a target query subjected to prefetching from iterative processing in the target program 20. Specifically, the instruction detecting unit 410 detects a query, in the target program 20, selects a record that satisfies a predetermined selection condition concerning a specified key variable from a target table and generates a resultant table. The query is treated as a target query. In the example shown in FIG. 2, a corresponding target query is the findByPrimaryKey method shown in the fourth line. In this query, the key variable is the variable personID, and the selection condition is that the primary key is the same as the value of the key variable. Moreover, the target table is the table PersonTaskList, and the resultant table is a table that includes all columns in a record that satisfies the selection condition.

The instruction detecting unit 410 may detect at least one operation instruction for a key variable or an instruction sequence that includes method calls, with the key variable being the input, as a target query. That is to say, a target query is at least one instruction to call for a series of processing steps that is completed within one cycle of iterative processing. A target query may be expressed by one instruction or a plurality of instructions according to specifications of a language.

The first-calculation-formula detecting unit 420 scans the target program 20 reversely along the execution path from the first target query to the second target query of iterative processing that is performed prior to the first target query. Then, the first-calculation-formula detecting unit 420 detects a first calculation formula for calculating the value of a key variable in the first target query of the iterative processing, with a resultant table from the second target query of the iterative processing being the input. In the example shown in FIG. 2, the key variable in the first target query is the value of the fourth column NextID of a resultant table from the second target query in the preceding iteration. Thus, the first calculation formula is expressed as, for example, a function called tailoffour( ), i.e., a function of selecting and returning the fourth column of the table. When an operation such as addition or subtraction to obtain the value of a key variable exists on this execution path, the first calculation formula includes the operation.

Moreover, the first-calculation-formula detecting unit 420 detects the number of times of trace-back that is the maximum number of cycles of iterative processing performed on a path from the first query to the second query, assuming that each query that is sequentially performed is the first target query. In the example shown in FIG. 2, the value of the variable personID in certain iteration processing is determined by the target query in the preceding iteration. In particular, a value is assigned to personID in the ninth line, and personTaskList-Bean, which is referred to in the ninth line, is generated by the target query in the fourth line in the same iterative processing. Thus, the first-calculation-formula detecting unit 420 detects that the number of times of trace-back is one for the target program 20.

As with the first-calculation-formula detecting unit 420, the second-calculation-formula detecting unit 430 scans the target program 20 reversely along the execution path from the first target query to the second target query, which is performed prior to the first target query. Then, the second-calculation-formula detecting unit 430 detects a second calculation formula for calculating the value of a determining variable that is used to determine to terminate the iterative of first query, with the resultant table from the second target query being the input. In the example shown in FIG. 2, the determining variable is the variable personID, as with the key variable. The value of this key variable is the value of the fourth column NextID of the resultant table from the target query in the preceding iteration. Thus, the second calculation formula is the function called tailoffour( ), as with the first calculation formula.

The number-of-columns setting unit 440 acquires template instructions 80 that are predetermined templates of recursive queries. The template instructions 80 include an initial query that generates an initial table, a recursive query that sequentially generates intermediate tables, and a final query that generates and outputs a final table. In particular, a recursive query is a query to generate from a first intermediate table the next intermediate table that satisfies a selection condition, with an initial table or a table that was generated by the last recursive query being the first intermediate table. A final query is a query to generate columns as the final table. The columns are selected from individual intermediate tables that are sequentially generated by recursive queries.

Typical specifications of a recursive query will now be described. In SQL99, a recursive query is expressed by, for example, the following combination of a with recursive clause and select instructions:

```
with recursive temp (f1, f2, f3) as (
    select f1, f2, f3 from TARGET_TABLE where f1 = 0
    union all
    select tgt.f1, tmp.f2, tgt.f3 from TARGET_TABLE tgt,
temp tmp where tgt.f2 = tmp.f1)
    select f1, f2, f3 from temp
```

The first select instruction represents an initial query. The next select instruction represents a recursive query. The final select instruction represents a final query. In each recursive query, the result of the last recursive query is given as an intermediate table tmp. Then, in each recursive query, the next intermediate table is generated on the basis of this intermediate table tmp and a target table tgt. Recursive queries are repeated until the result of a recursive query is an empty set. Then, intermediate tables generated by individual recursive queries are sequentially concatenated and given to a final query.

In SQL99 and the like, only an intermediate table that can be referred to by a recursive query is an intermediate table that was generated by the last recursive query, and intermediate tables that were generated by recursive queries prior to the last recursive query cannot be referred to. On the other hand, when the number of times of trace-back detected by the first-calculation-formula detecting unit 420 is more than one, it is necessary to refer to intermediate tables that were generated by recursive queries prior to the last recursive query. Thus, the number of columns of a target query is less than the number of columns of an intermediate table of a recursive query, and as many columns as can store intermediate tables that were generated by recursive queries prior to the last recursive query are needed.

Thus, the number-of-columns setting unit 440 sets the number of columns of an intermediate table of a recursive query so as to be a number that is obtained by multiplying the number of times of trace-back detected by the first-calculation-formula detecting unit 420 by the number of columns of a target query detected by the instruction detecting unit 410. A resultant table that was generated by a target query in the last iteration is stored in leading columns in an intermediate table. Resultant tables that were generated by the target queries in iterations prior to the last iteration are stored in columns following the leading columns. In the example shown in FIG. 2, the number of times of trace-back is one, and the number of columns of the target query is four. Thus, the number of columns of an intermediate table is four that is obtained by multiplying one by four. When pieces of external input are supplied, the number-of-columns setting unit 440 adds the number of the pieces of external input to the number of columns of an intermediate table.

The initial-query generating unit 450 generates an initial query. The generated initial query is a query to generate a table as an initial table. The table includes the values of variables that are predetermined prior to starting iterative processing in the target program 20 and resultant tables from a target query in individual cycles of the iterative processing performed after a cycle of the iterative processing to which as many cycles of the iterative processing as the number of times of trace-back are traced back. In the example shown in FIG. 2, since one is assigned to personID in the first line prior to starting iterative processing, the initial table includes a constant one. Moreover, in the example shown in FIG. 2, since the number of times of trace-back is one, the initial table includes no resultant table.

The recursive-query generating unit 460 generates a recursive query. The generated recursive query is a query to generate the next intermediate table, in each recursive query corresponding to each iterative processing that is sequentially performed, by selecting columns and a record that satisfies a selection condition, which are referred to by a target query in the subsequent iterative processing, on the basis of a target table and an intermediate table that includes resultant tables that were generated by the target query in preceding iteration. In detail, a recursive query is a query to generate the next intermediate table by selecting a record that satisfies a selection condition in relation to the calculation result of inputting a first intermediate table to the first calculation formula on the basis of a target table and the first intermediate table.

In the example shown in FIG. 2, a recursive query corresponds to the process of selecting from PersonTaskList records that have values of the first column that are the same as the value of the fourth column of an intermediate table, with records that were read from PersonTaskList in the last recursive query being the intermediate table. The selected records are the next intermediate table. A recursive query also serves as a query to terminate a recursive query on condition that the calculation result of inputting an intermediate table to the second calculation formula satisfies a condition for determining to terminate the recursive query and generate the next intermediate table on condition that the calculation result does not satisfy the condition for determining to terminate the recursive query.

The final-query generating unit 470 generates a query to select at least a part of columns of intermediate tables that were sequentially generated by a recursive query as a final query.

Figure 5:
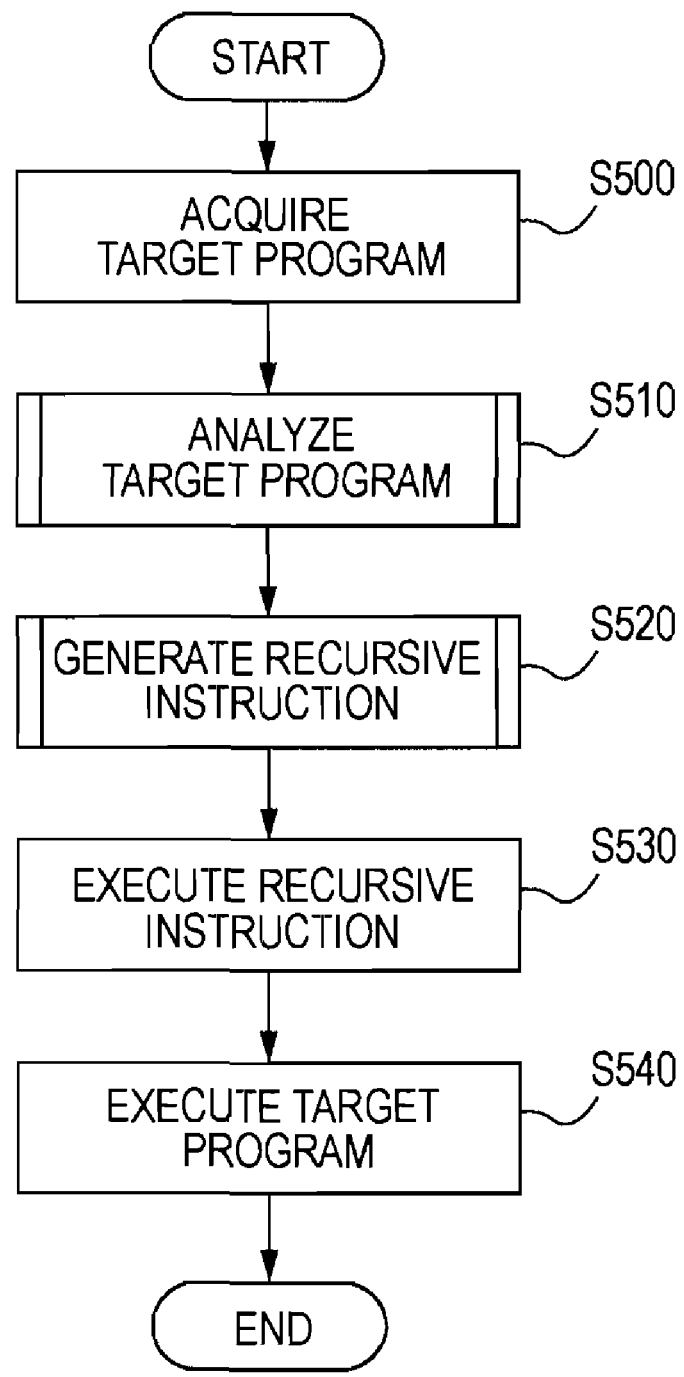
FIG. 5 shows an exemplary process of prefetching necessary data by analyzing the target program 20 in the embodiments of the present invention.

FIG. 5 shows an exemplary process of prefetching necessary data by analyzing the target program 20 in the embodiments of the present invention. The acquiring unit 400 acquires the target program 20 from the terminal unit 15 (S500). The instruction detecting unit 410, the first-calculation-formula detecting unit 420, and the second-calculation-formula detecting unit 430 analyze the target program 20 (S510). The number-of-columns setting unit 440, the initial-query generating unit 450, the recursive-query generating unit 460, and the final-query generating unit 470 generate the recursive query 82 (S520). The program execution unit 45 acquires data necessary to execute the target program 20 from the database 35 by executing the recursive query 82 prior to executing the target program 20 and records the data in the cache unit 48 (S530). Then, the program execution unit 45 executes the target program 20.

Figure 6:
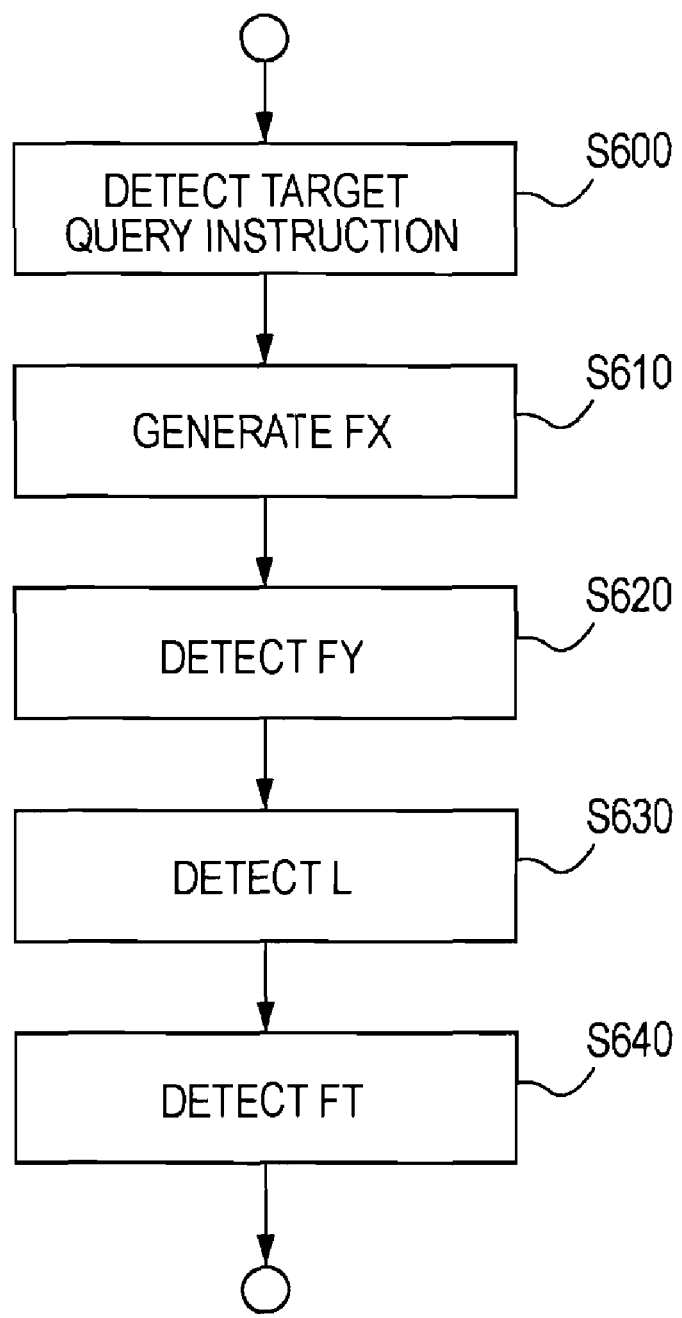
FIG. 6 shows the outline of processing in S510 in FIG. 5.

FIG. 6 shows the outline of processing in step S510 in FIG. 5. The instruction detecting unit 410 detects a target query (S600). When the target program 20 is a Java program based on EJB, the instruction detecting unit 410 may detects an instruction that includes the findByPrimaryKey method as a target query. Then, the instruction detecting unit 410 generates a function FX( ) that defines the relationship between a key variable and a resultant table on the basis of the detected target query (S610). FX( ) is expressed as follows, using a lambda expression with x being a variable:

$$FX(\ )=\lambda x.(\text{select } OF \text{ from } T \text{ where } F(x)).$$

A variable that is abstracted from a key variable is x, and a column name list of a target query is OF. Moreover, a table name list of the target query is T, and a selection condition of the target query is F( ). That is to say, FX( ) shows the relationship between the key variable x, which is input, and a resultant table that is obtained by selecting a record that satisfies the selection condition F( ) in relation to the key variable x from the table T.

Then, the first-calculation-formula detecting unit 420 generates a define-use (D-U) chain regarding the target query, traces back the D-U chain to detect a path from the key variable of the first target query of the iterative processing to the resultant table from the second target query of the iterative processing, and detects calculation that is performed on this path to obtain the value of the key variable from the resultant table as the first calculation formula (S620).

The first calculation formula is expressed as a function FY that shows the relationship between an input table and an output key variable. In FY, individual columns of a resultant table from a target query in a cycle of iterative processing to which one cycle of the iterative processing is traced back are $o\_1\_1$ to $o\_1\_h$, and individual columns of a resultant table from the target query in a cycle of the iterative processing to which (N−1) cycles of the iterative processing are traced back are $o\_(N-1)\_1$ to $o\_(N-1)\_h$. FY is expressed as a set of the following functions $FY\_1$ to $FY\_m$:

$$I\_N\_1 = FY\_1(o\_1\_1, o\_1\_2, ..., o\_1\_h,$$
$$o\_2\_1, o\_2\_2, ..., o\_2\_h,$$
$$...$$

-continued

```
o_(N-1)_1, o_(N-1)_2, ..., o_(N-1)_h, external input)
I_N_2 = FY_2(o_1_1, o_1_2, ..., o_1_h,
o_2_1, o_2_2, ..., o_2_h,
...
o_(N-1)_1, o_(N-1)_2, ..., o_(N-1)_h, external input)
...
I_N_m = FY_m(o_1_1, o_1_2, ..., o_1_h,
o_2_1, o_2_2, ..., o_2_h,
...
o_(N-1)_1, o_(N-1)_2, ..., o_(N-1)_h, external input).
```

Here, I_N_1 to I_N_m are a set of key variables. In the example shown in FIG. 2, since one key variable exists, FY is a function that is the same as only one of FY_1 to FY_m. Specifically, FY is a function of obtaining and returning the value of the fourth column of a resultant table from the target query in a cycle of iterative processing to which one cycle of the iterative processing is traced back, as described above. That is to say, according to this expression, FY=o_1_4.

Then, the first-calculation-formula detecting unit 420 detects the number of times of trace-back (S630). The number of times of trace-back is counted by tracing back the D-U chain generated in step S620 from the key variable to the target query. The detected number of times of trace-back is L.

Then, the first-calculation-formula detecting unit 420 selects a path from the determining variable, which is used to determine to terminate the processing, to the target query by tracing back the D-U chain and detects calculation that is performed on the resultant table on this path as the second calculation formula (S640). The termination condition, which includes the detected second calculation formula, is FT. FT is a function that is true when the calculation result of the second calculation formula satisfies the termination condition.

Figure 7:
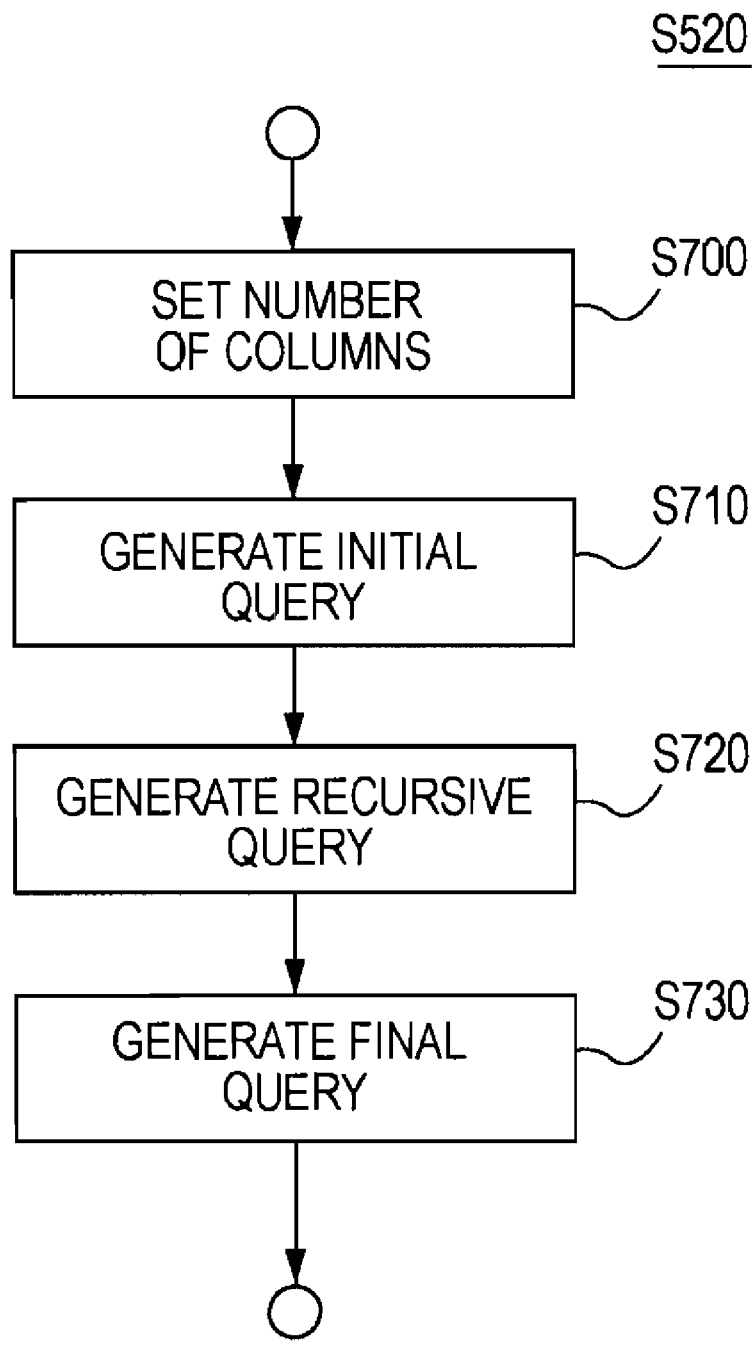
FIG. 7 shows the outline of processing in S520 in FIG. 5.

FIG. 7 shows the outline of processing in step S520 in FIG. 5. FIG. 8 shows the template instructions 80, the recursive query 82, which is generated on the basis of the target program 20 according the first example, and an improved query 84 in parallel. The flow of processing in step S520 will now be described with reference to FIG. 8. The number-of-columns setting unit 440 sets the number of columns of an intermediate table of a recursive query so as to be a number that is obtained by multiplying the number of times of trace-back by the number of columns of a column name list of a target query (S700). In detail, the number-of-columns setting unit 440 sets as many variables as this number of columns in an argument list of the recursive query. A string of these variables is expressed as ROWS_LAST. This means a row (i.e., a record) that is selected from a table by the last recursive query, from the viewpoint of each recursive query. ROWS_LAST is expressed as, for example, the following variable string, using the number L of times of trace-back and the column number h of the target query:

```
ROWS_LAST =
{f_L_1, f_L_2, ..., f_L_h,
f_(L-1)_1, f_(L-1)_2, ..., f_(L-1)_h,
...
f_2_1, f_2_2, ..., f_2_h,
f_1_1, f_1_2, ..., f_1_h}.
```

In order to set up such an intermediate table, the number-of-columns setting unit 440 generates a part that defines the recursive query as follows, the part corresponding to the first line in part (a) of FIG. 8:

with recursive temp (ROWS_LAST) as, where temp represents an intermediate table that is sequentially generated by a recursive query.

In the example shown in FIG. 2, since the number L of times of trace-back is one and the column number h is four, ROWS_LAST={f_1_1, f_1_2, f_1_3, f_1_4}. That is to say, a part that defines the recursive query is made as follows, the part corresponding to the first line in part (b) of FIG. 8:

with recursive temp (f_1_1, f_1_2, f_1_3, f_1_4).

Then, the initial-query generating unit 450 generates an initial query (S710). An initial query is a query to generate an initial table that includes the values of variables that are set prior to starting iterative processing and resultant tables from a target query in individual cycles of the iterative processing performed after a cycle of the iterative processing to which as many cycles of the iterative processing as the number (L) of times of trace-back are traced back. When the number L of times of trace-back is one, the initial table includes only the values of the variables and no resultant table. A string of resultant tables and the values of variables included in an initial table are expressed in the following general form:

$$O'\_(L+1) = O\_L, O\_(L-1), O\_(L\_2), \ldots, O\_1.$$

This corresponds to the second line in part (a) of FIG. 8. Here, O'_(L+1) represents a column name list of a table that is generated as an initial table, O_L represents a resultant table that is generated by a target query in the (L−1)th iterative processing, and O_1 represents a table that includes the values of variables that are set prior to starting iterative processing. These are expressed in the following general form:

O_1=(a table that includes the values of variables that are set prior to starting iterative processing), $$O\_n = FX(FY(O\_n-1)), \text{ where } n > 1.$$

In the example shown in FIG. 2, since the number L of times of trace-back is one, the initial table is expressed as follows:

$$O'\_(L+1) = O'\_2 = O\_1.$$

That is to say, the initial table is a table that includes the values of variables that are set prior to starting iterative processing. For example, the initial-query generating unit 450 generates the following table as the initial table in the example shown in FIG. 2, the table corresponding to the second line in part (b) of FIG. 8:

O_1={dummy, dummy, dummy, 1}.

A constant one of the fourth column is the value of the variable personID. Since the initial table is used as an intermediate table in the first recursive query, the initial-query generating unit 450 sets the value of the variable personID in the fourth column on the basis of the detected first calculation formula (FY). That is to say, the initial-query generating unit 450 stores the value of the variable personID in the initial table so that the value of the variable personID can be calculated from the intermediate table by the first calculation formula (FY). Since the select instruction always includes the where clause according the specifications, a condition that is always true is described in the where clause. In the example shown in part (a) of FIG. 8, d.id=1.

The values of variables, FX, and FY are statically determined regardless of the dynamic operation of a recursive query. Thus, generation of this initial query does not prevent a recurrence formula from being established.

The recursive-query generating unit 460 generates a recursive query (S720). A recursive query is a query to process each recursive query corresponding to each iteration. Each recursive query is the process of removing the first generated resultant table from an intermediate table that includes resultant tables in individual cycles of iterative processing that range from a corresponding cycle of the iterative processing to a cycle of the iterative processing to which as many cycles of the iterative processing as the number L of times of traceback are traced back, selecting a record that satisfies a selection condition of a target query from a target table, and adding the record to the intermediate table to generate the next intermediate table.

A formula that represents the details of processing of a recursive query is expressed as follows, using the symbol O'_n (i.e., a string of the (n-L)th to (n−1)th resultant tables) defined in the description of step S710:

$$O'\_(M+1)=O\_M+CutTail(O'\_M),$$

where O'_M represents an intermediate table that is generated by the Mth recursive query, O'_(M+1) represents an intermediate table that is generated by the (M+1)th recursive query, O_M represents a record that is selected from a target table by the Mth recursive query, and CutTail represents a function of removing the first generated (i.e., located at the end) resultant table.

Here, O_M is expressed as follows by FX and FY, with the resultant tables from the target query in individual cycles of iterative processing that range from the first cycle of the iterative processing to a cycle of the iterative processing to which L cycles of the iterative processing are traced back being the input:

$$O\_M=FX(FY(O\_(M-L), O\_(M-L+1), \ldots, O\_(M-1))).$$

Since a string that is given to FY is O'_M, O'_(M+1) is expressed by the following formula:

$$O'\_(M+1)=FX(FY(O'\_M))+CutTail(O'\_M).$$

This shows that the intermediate table generated by the (M+1)th recursive query depends on the intermediate table generated by the Mth recursive query. That is to say, the details of processing the recursive query is expressed as a recurrence formula that depends only on the result of the last recursive query.

When the intermediate table includes external input, the recursive query may further include the external input in the column name list.

Thus, the recursive query is expressed as follows with the select instruction of SQL (corresponding to the fourth to sixth lines in part (a) of FIG. 8):

select [OF](FX( )), ROWS_LAST_CUTTAIL, E_IN from [T](FX( )), temp t, dummy d
where [F](FX( ))(FY(ROWS_LAST, E_IN)) and d.id=case when FT(ROWS_LAST, E_IN) then 0 else 1 end.

Here, [OF](FX( )) represents the column name list of the target query, ROWS_LAST_CUTTAIL represents a list of columns that are obtained by removing the first generated resultant table from ROWS_LAST. For example, when ROWS_LAST={f_1_1, f_1_2, f_1_3, f_1_4, f_2_1, f_2_2, f_2_3, f_2_4}, a resultant table from the target query in a cycle of iterative processing to which two cycles of the iterative processing is traced back is removed, and thus ROWS_LAST_CUTTAIL={f_1_1, f_1_2, f_1_3, f_1_4}.

Here, E_IN represents a column that stores the value of external input, [T](FX( )) represents the table name list of the target query, i.e., the target table, t represents the intermediate table, and d includes only a column called id and represents a table that stores a value of one. The description regarding d and the case when clause is provided below. Furthermore, [F](FX( ))(FY(ROWS_LAST, E_IN)) represents a condition for determining whether the selection condition is satisfied in relation to a resultant table from the target query in the last iterative processing. In detail, [F](FX( )) represents the selection condition of the target query. Furthermore, FY(ROWS_LAST, E_IN) represents the calculation result of inputting the resultant table in the last iterative processing to the first calculation formula. This is because ROWS_LAST is the intermediate table and includes the resultant table in the last iterative processing.

In the example shown in FIG. 2, [OF](FX( )) is {ID, Name, TaskName, nextID}. Furthermore, [T](FX( )) is PersonTaskList and expressed by, for example, a variable p so that PersonTaskList can be referred to by the select instruction. That is to say, [T](FX( )) is expressed as PersonTaskList p. In keeping with this, [OF](FX( )) is expressed as {p.ID, p.Name, p.TaskName, p.nextID}. Furthermore, ROWS_LAST_CUTTAIL is expressed as an empty set (hereinafter, this is treated as NULL). Since the selection condition is that the column ID is equal to the value of the key variable, the condition clause where is p.ID=?. Furthermore, the key variable can be obtained by the first calculation formula and thus is the value of the fourth column of the intermediate table, i.e., t.f_1_4.

Thus, the following select instruction is generated as a recursive query, the instruction corresponding to the fourth and fifth lines in part (b) of FIG. 8:

select p.ID, p.Name, p.TaskName, p.nextID from PersonTaskList p, temp t, dummy d where p.ID=t.f_1_4 and d.id=case when t.f_1_4=0 then 0 else 1 end.

The recursive query also has a function of terminating the recursive query on condition that the calculation result of inputting the intermediate table to the second calculation formula satisfies the condition for determining to terminate the target query. The recursive-query generating unit 460 adds to the selection condition of the target query a condition for continuing the recursive query that the calculation result of inputting the last intermediate table to the second calculation formula does not satisfy the condition for determining to terminate the target query so that the recursive query has this function. This condition for continuing the recursive query is implemented via the foregoing case when clause. That is to say, FT(ROWS_LAST, E_IN) is true when the calculation result of inputting a resultant table to the second calculation formula satisfies the condition for determining to terminate the target query. When this is true, a constant zero is equal to the value of the case when clause, and the recursive query is terminated. For example, in the example shown in FIG. 2, since the fourth column is selected in the second calculation formula, case when t.f_1_4=0.

The final-query generating unit 470 generates a final query (S730). A final query is a query to select a part that is selected in a corresponding recursive query from a target table from an intermediate table that is generated in each recursive query. Since a record that is generated from a target table in each recursive query is added to the top of an intermediate table, a final query is a query to select leading columns of the intermediate table. The general form of a final query is expressed as the following instruction, as shown in the eighth line in part (a) of FIG. 8:

select ROWS_HEAD from temp.

Here, ROWS_HEAD represents a column name list of columns selected from a target table in each recursive query. For example, when ROWS_LAST={f_1_1, f_1_2, f_1_3, f_1_4, f_2_1, f_2_2, f_2_3, f_2_4}, a resultant table from a target query in a cycle of iterative processing to which two cycles of the iterative processing are traced back is removed, and thus ROWS_HEAD={f_1_1, f_1_2, f_1_3, f_1_4}. In the example shown in FIG. 2, since the number L of times of trace-back is one, ROWS_HEAD={f_1_1, f_1_2, f_1_3, f_1_4}.

Finally, the improved query 84, which is an improved example of the recursive query 82, is shown in part (c) of FIG. 8. In the example shown in part (c) of FIG. 8, the number-of-columns setting unit 440 may add a variable count for counting the number of times of recursive queries to a column name list of a recursive query. In this case, the initial-query generating unit 450 adds a constant zero to a column name list of an initial query so that the initial value of the variable count is zero. The recursive-query generating unit 460 adds a value that is obtained by adding one to the variable count to a column name list of a recursive query. Furthermore, the recursive-query generating unit 460 adds a condition that the value of the variable count is less than the upper limit number MAX to the condition clause of the recursive query. In the improved query 84, the maximum number of times of recursive queries can be set, and thus time necessary for prefetching can be limited.

FIG. 9 shows a second example of the target program 20 input to the application server 40. FIG. 10 shows an example of data, out of the database 35, necessary to execute the second example of the target program 20. In the second example, the target program 20 represents a program for searching a target table for a record that satisfies a predetermined condition, the program being an example of online analytical processing (OLAP). The target table is ARawData shown in FIG. 10. Here, ARawData shows the result of, for example, colleting or analyzing data. Assuming that ARawData is a function, ARawData stores values output from this function corresponding to values of a column ID in a column aValue. This function is called RawData.

A function MyFunc that can be referred to within the target program 20 is predetermined. The object of the second example is to obtain the value of the ID that represents the intersection point of the function MyFunc and the function RawData. In order to obtain the ID that represents the intersection point of these functions, a function is generated by subtracting the function RawData from the function MyFunc, and the ID that represents a point at which the sign of the value of this function changes is obtained. The target program 20 searches for the value of such an ID by binary search and outputs the value of aValue corresponding to the ID.

In detail, a constant X in the first line represents the upper limit of an initial search range of binary search. A variable greater represents the upper limit of a search range in each search. A constant Y in the second line represents the lower limit of an initial search range of binary search. A variable less represents the lower limit of a search range in each search. A variable aValue in the third line is a variable for storing the value of aValue corresponding to the value of the ID at the middle of each search range. A constant Z that has no effect on search is assigned to the variable aValue for the sake of convenience.

The fourth to fourteenth lines correspond to iterative processing. Each iterative processing corresponds to each search. An instruction in the fifth line is an instruction to assign the value of the ID at the middle of a search range to a variable middle. An instruction in the sixth line is an instruction to determine whether the iterative processing needs to be terminated and terminate the iterative processing when the middle of the last search range is the intersection point. An instruction in the seventh line is a target query to read a record from ARawData, with the variable middle being a key variable. An instruction in the eighth line is an instruction to read the value of the column aValue from the read record and assign the value to the variable aValue. Instructions in the ninth to twelfth lines represent instructions to, when the middle of the last search range is not the intersection point, determine which of ranges the intersection point exists in, the ranges being obtained by dividing the last search range at the middle, and set the range in which the intersection point exists as the next search range.

FIG. 11 shows an additional table necessary to analyze the program in the second example. In order to analyze the program, the number-of-columns setting unit 440 generates a table called INDENT that expresses identity mapping for the sake of convenience. The table INDENT includes columns greater, less, X1, and X2. The table INDENT includes only one record, and the elements are X, Y, X, and Y in this order.

FIG. 12 shows concrete examples of the recursive query 82 that are generated on the basis of the target program 20 in the second example. The instruction detecting unit 410 detects the findByPrimarykey method in the seventh line in the target program 20 as a target query. A function FX corresponding to this target query is expressed as follows, using a function F( ) that represents a selection condition:

$$FX( )=\lambda x1x2x3. \text{(select } a.ID, a.aValue, i.greater, i.less \text{ from ARawData } a, \text{ IDENT } i \text{ where } F(x1, x2, x3)),$$

$$F( )=\lambda x1x2x3. (i.X1=x1 \text{ and } i.X2=x2 \text{ and } a.ID=x3).$$

According to this, a select instruction shown in the fourth to sixth lines in part (a) of FIG. 12 is generated.

Furthermore, the first-calculation-formula detecting unit 420 detects a calculation formula that obtains the value of the variable middle in the next iterative processing from bean in the seventh line as the first calculation formula. A function FY that represents the first calculation formula is expressed below, using functions FY_x1, FY_x2, and FY_x3. Since the values of individual variables depend only on the last iterative processing, the number L of times of trace-back is one.

FY_x1( )=λxy. (case when SecondOfFour(x)−MyFunc(FirstOfFour(x))>0.0 then (ThirdOfFour(x)+FourthOfFour(x))/2 else ThirdOfFour(x)), FY_x2( )=λxy. (case when !(SecondOfFour(x)−MyFunc(FirstOfFour(x))>0.0) then (ThirdOfFour(x)+FourthOfFour(x))/2 else FourthofFour(x)), FY_x3( )=λxy. ((ThirdOfFour(x)+FourthOfFour(x))/2).

Furthermore, the second-calculation-formula detecting unit 430 detects the second calculation formula for obtaining the first determining variable middle and the second determining variable aValue for checking the termination condition shown in the sixth line from a resultant table from a target query in the last iterative processing. A termination condition FT that includes the second calculation formula is expressed as follows:

$$FT( )=\lambda xy.(SecondOfFour(x)-MyFunc(FirstOfFour(x))=0.0).$$

Since the number of times of trace-back is one, an initial table includes only predetermined constants. Specifically, the initial table is {(X+Y)/2, Z, X, Y}, and ROWS_LAST, ROWS_LAST_CUTTAIL, and ROWS_HEAD are similar to those in the first example.

When the table INDENT, which is set up for the sake of convenience, is removed from the select instruction in part (a) of FIG. 12, the program shown in part (b) in FIG. 12 is obtained. Specifically, the number-of-columns setting unit 440 first detects the condition clause in the recursive query 82 shown in part (a) of FIG. 12. Then, the number-of-columns setting unit 440 detects a term for which it is determined whether the term is the same as i.X1 in the condition clause. This term is, for example, a term that starts with case when in the fifth line in part (a) of FIG. 12. The number-of-columns setting unit 440 replaces i.greater in a column name list with this term. Similarly, the number-of-columns setting unit 440 replaces i.less in the column name list with a term in the sixth line, for which it is determined whether this term is the same as i.X2. Then, the number-of-columns setting unit 440 deletes the condition clause related to i.X1 and i.X2.

Thus, even when various types of calculation and selection are performed to obtain the value of the key variable from the resultant table, as shown in the second example, a recursive query for proper prefetching can be generated.

FIG. 13 shows a third example of the target program 20 input to the application server 40. FIG. 14 is an example of data, out of the database 35, necessary to execute the target program 20 in the third example. The object of the target program 20 in the third example is to increase salaries of individual employees by 10,000 units in an employee table for managing salaries of employees. The database 35 includes the employee table and an organization table, as shown in FIG. 14. The employee table includes an employee number column, an employee name column, an employee salary column, and a column that indicates the employee number of the manager (hereinafter, called a department leader) of the department to which each employee belongs. For example, the employee number of Koseki is 40001, the salary is 700,000 units, and the employee number of the department leader is 20000. The organization table includes a column for department codes, a column for managers, and a column for names. For example, the employee number of the manager of a department that has a department code of S7000 is 10000, and the name of the department is TRL.

The hierarchical structure of the organization can be analyzed on the basis of employee numbers and employee numbers of department leaders in the employee table. That is to say, for example, the employee number of Kuse is 10000, and the employee number of the department leader of Nakatani is 10000. Thus, a department Systems of Nakatani is positioned as a department that belongs to a department TRL of Kuse.

The target program 20 includes an instruction to generate data having a list structure for storing department codes in the first line. The target program 20 includes an instruction to add a department code S7000 to the data in the second line. The target program 20 includes instructions that represent iterative processing in the third to sixteenth lines. The target program 20 includes an instruction to retrieve one element from the data having a list structure in the fourth line. The retrieved element is stored in a variable deptno. The target program 20 includes an instruction to select a record from the organization table, with the variable deptno being the key variable, in the fifth line. The selected record is assigned to a variable department.

The target program 20 includes an instruction to acquire the employee number of the manager of the department of the department code specified by the variable deptno from the selected record in the sixth line. The acquired employee number is stored in a variable mgrNo. The target program 20 includes an instruction to select records from the employee table, with the variable mgrNo being the key variable, in the seventh line. The selected records are stored in a variable named employees. The target program 20 includes in the eighth to fifteenth lines other iterative processing in which the same processing is sequentially performed on the record of each employee stored in the variable employees.

In detail, the target program 20 includes an instruction to increase the value that indicates the salary of a corresponding employee by 10,000 units in the ninth line. The target program 20 includes an instruction to select from the organization table records that have the employee number of the corresponding employee as the employee number of a manager in the tenth and eleventh lines. The records are assigned to a variable subDept. The target program 20 includes an instruction to add elements in the variable subDept to the list structure for storing department codes in the twelfth and thirteenth lines.

In the target program 20, while the employee table is scanned, subordinate departments the manager of which are an employee subjected to scanning are sequentially scanned, and salaries of all employees in all of the subordinate departments are increased by 10,000 units. In this way, in the third example, since the subordinate departments are dynamically and sequentially searched for, records to be read are dynamically determined by the search result. That is to say, in known arts, perfecting cannot be applied to a program as in the third example.

FIG. 15 shows a concrete example of the recursive query 82. The example is generated on the basis of the target program 20 shown in the third example. The instruction detecting unit 410 detects an instruction sequence from the fifth to eleventh lines in the target program 20 as a target query. A function FX corresponding to this target query is expressed as follows, using a function F( ) that represents a selection condition:

FX( )=$\lambda$x. (Select d1.deptCode, e.salary from Dept d1, Employee e, Dept d2 where F(x)), F( )=$\lambda$x.(d1.mgrNum=e.empNum and e.mgrNum=d2.mgrNum and d2.deptCode=x).

The first-calculation-formula detecting unit 420 detects a calculation formula that acquires the value of the variable deptno in the next iterative processing from DepartmentBean in the tenth line as the first calculation formula. Since the step shown in the tenth and eleventh lines is performed in the iterative processing, more than one resultant table may be generated in the third example. In this case, it is difficult to generate a D-U chain about the resultant tables or very time-consuming in many cases even if the D-U chain can be generated. This is because the same processing is sequentially repeated on each of the multiple employee records by the instruction in the eighth line. Even in this case, the first-calculation-formula detecting unit 420 generates a D-U chain by handling this iterative processing as processing that is performed on any one of the employee records so that a proper analysis can be performed. Then, the first-calculation-formula detecting unit 420 sequentially traces back this D-U chain to select a path from a key variable (deptno) to a resultant table (departmentBean). It should be noted that a recursive query that is generated in this processing prefetches data necessary and sufficient to execute the program due to the nature of SQL.

The first calculation formula detected is the process of selecting the first element in a position table. The first calculation formula is expressed by the following FY, the number of times of trace-back being one since the value of each variable depends only on the last iterative processing:

FY( )=$\lambda$xy. (FirstOfColumns(x)) (the first element in a row that is selected).

Thus, a select instruction shown in the fourth to fifth lines in FIG. 15 is generated.

The second-calculation-formula detecting unit 430 detects the second calculation formula that acquires from a resultant table from a target query in the last iterative processing deptCodes for checking the termination condition shown in the third line. The termination condition FT that includes the second calculation formula is expressed as follows:

$$FT(\ )=\lambda xy.(\text{select }[OF](FX(\ ))\text{ from }[T](FX(\ )), \text{temp } t,$$
$$\text{dummy } d \text{ where } [F](FX(\ ))(FY(x,y))=\text{null}).$$

Thus, a recursive query shown in the fourth to eighth lines in FIG. 15 is generated.

Furthermore, since the number of times of trace-back is one, the initial table includes only predetermined constants. Specifically, the initial table is {S7400, "dummy"}, ROWS_LAST and ROWS_HEAD are {f_1_1, f_1_2}, and ROWS_LAST_CUTTAIL is NULL.

Accordingly, the program analysis unit 42 can generate the recursive query 82 shown in FIG. 15 as a recursive query.

FIG. 16 shows the improved query 84 that is an improved example of the recursive query 82. When no record that satisfies a selection condition of a target query exists in a resultant table and when the calculation result of inputting an intermediate table to the second calculation formula satisfies a condition for determining to terminate the processing, the recursive-query generating unit 460 does not add a condition for continuing a recursive query to the selection condition. That is to say, when the termination condition is satisfied and when a record that is selected under conditions in the fore part of a where clause in a recursive query is NULL, the recursive query is normally terminated without the condition for continuing a recursive query being checked by a case when clause in the hind part of the where clause. In this case, the recursive-query generating unit 460 does not add the case when clause for checking the condition for continuing a recursive query to the recursive query regardless of FT. The structure of a recursive query can be simplified by performing such optimization, and thus time necessary for prefetching can be reduced.

Figure 17:
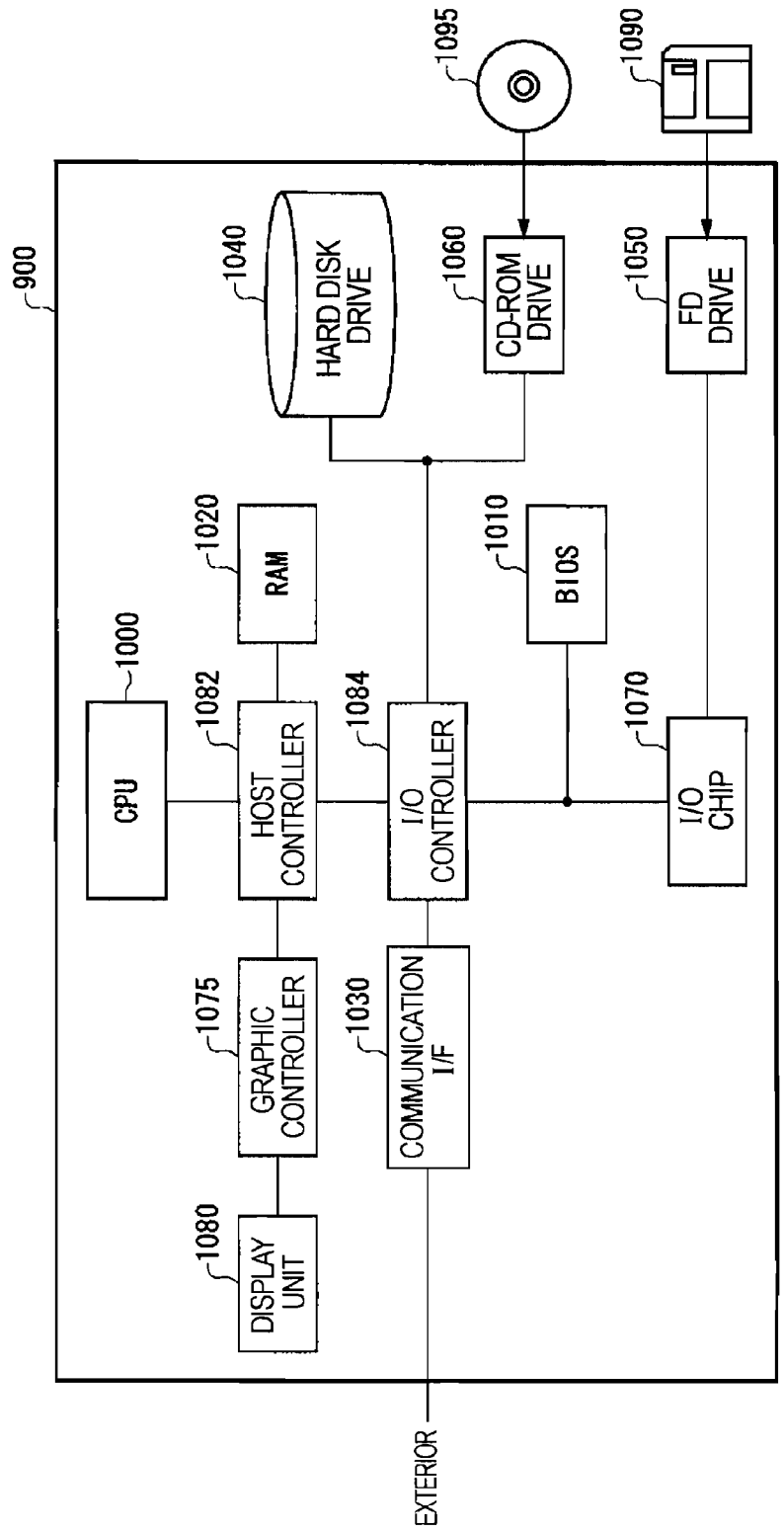
FIG. 17 shows an example of the hardware configuration of a computer 900 functioning as the application server 40 according to the embodiments of the present invention.

FIG. 17 shows an example of the hardware configuration of the computer 900 functioning as the application server 40 according to the embodiments of the present invention. The computer 900 includes a CPU section that includes a CPU 1000, a RAM 1020, and a graphic controller 1075 that are connected to each other via a host controller 1082, an input/output section that includes a communication interface 1030, a hard disk drive 1040, and a CD-ROM drive 1060 that are connected to the host controller 1082 via an input/output controller 1084, and a legacy input/output section that includes a BIOS 1010, a flexible disk drive 1050, and an input/output chip 1070 that are connected to the input/output controller 1084.

The host controller 1082 connects the RAM 1020 to the CPU 1000 and the graphic controller 1075, which access the RAM 1020 at a high transfer rate. The CPU 1000 operates according to programs stored in the BIOS 1010 and the RAM 1020 to control the components. The graphic controller 1075 obtains image data generated by, for example, the CPU 1000 in a frame buffer provided in the RAM 1020 and displays the image data on a display unit 1080. Instead of this arrangement, the graphic controller 1075 may include a frame buffer that stores image data generated by, for example, the CPU 1000.

The input/output controller 1084 connects the host controller 1082 to the communication interface 1030, the hard disk drive 1040, and the CD-ROM drive 1060, which are relatively high-speed input/output units. The communication interface 1030 communicates with external devices via networks. The hard disk drive 1040 stores programs and data that are used by the computer 900. The CD-ROM drive 1060 reads programs or data from a CD-ROM 1095 and supplies the programs or data to the RAM 1020 or the hard disk drive 1040.

Furthermore, the BIOS 1010, the flexible disk drive 1050, the input/output chip 1070, and the like, which are relatively low-speed input/output units, are connected to the input/output controller 1084. The BIOS 1010 stores a boot program that is executed by the CPU 1000 upon starting up the computer 900, programs that depend on the hardware of the computer 900, and the like. The flexible disk drive 1050 reads programs or data from a flexible disk 1090 and supplies the programs or data to the RAM 1020 or the hard disk drive 1040 via the input/output chip 1070. The flexible disk drive 1050 or various types of input/output unit via, for example, a parallel port, a serial port, a keyboard port, or a mouse port are connected to the input/output chip 1070.

Programs supplied to the computer 900, for example, a control program according to the present invention, are stored in a recording medium, for example, the flexible disk 1090, the CD-ROM 1095, or an IC card and supplied to users. The programs are read from the recording medium via the input/output chip 1070 and/or the input/output controller 1084, installed in the computer 900, and executed. The operation that is performed by, for example, the computer 900 under the control of the control program is the same as the operation of the application server 40 described in FIGS. 1 to 16, and thus the description is omitted here.

The foregoing programs may be stored in an external recording medium. In addition to the flexible disk 1090 and the CD-ROM 1095, an optical recording medium such as a DVD or a PD, a magneto-optical recording medium such as an MD, a tape medium, a semiconductor memory such as an IC card, or the like may be used as the recording medium. Furthermore, a storage unit, such as a hard disk or a RAM, provided in a server system connected to a dedicated communication network, the Internet, or the like may be used as the recording medium to provide the programs to the computer 900 via networks.

In the information processing system 10 according to the embodiments, instructions that are not subjected to data prefetching in known arts are subjected to data prefetching, and thus the efficiency of execution of a program can be improved. Specifically, a program in which a record to be read is dynamically determined may be subjected to data prefetching. Furthermore, a program in which a certain cycle of iterative processing depends on the results of the preceding cycles, including the last cycle, of the iterative processing may be subjected to data prefetching. AS the result of actually performing a test using the first example of the program, it was found that the efficiency of execution of the program is increased by about thirty times that in known arts.

While the present invention has been described using the embodiments, the technical scope of the present invention is not limited to the scope described in the foregoing embodiments. It is apparent to those skilled in the art that various changes or improvements can be made in the foregoing embodiments. It is apparent from the description in the claims that the embodiments that are changed or improved may be included in the technical scope of the present invention.

What is claimed is:

1. A method in which a computer executes a recursive access instruction including an initial query instruction for generating an initial table, a recursive query instruction for sequentially generating individual intermediate tables, and a final query instruction for generating and outputting a final table formed from the individual intermediate tables, prior to executing a program subjected to prefetching to prefetch data necessary to execute the program from a database and supply the data to the program, comprising:

- a step of acquiring the program;
- a step of detecting a query instruction to select a record which satisfies a predetermined selection condition from a target table, and to generate a resultant table from the recursive query instruction as a target query instruction to be a prefetching target;
- an initial query instruction generating step of generating the initial query instruction;
- an iterative processing step for generating an intermediate table;
- a recursive query instruction generating step of generating an instruction for processing a recursive query corresponding to each iterative processing step, as a recursive query instruction; and
- a final query instruction generating step of generating the final query instruction, wherein in the initial query instruction generating step, an instruction for generating a table including a variable value, which is preset prior to a start of the iterative processing step in the program, as the initial table, is generated as the initial query instruction;

in the recursive query instruction generating step, in each iterative processing step to be sequentially executed, the instruction for processing a recursive query generates a next intermediate table by selecting an intermediate table including a resultant table generated due to the target query instruction of a prior iterative processing step or therebefore, a column to be referred to by the target query instruction of next iterative processing and thereafter, and the record satisfying the selection condition, as the recursive query instruction; and in the final query instruction generating step, the instruction to select at least a portion of a column in the intermediate table that is sequentially generated due to the recursive query instruction is generated as the final query instruction.

* * * * *